(12) United States Patent
Gillig et al.

(10) Patent No.: US 8,127,337 B2
(45) Date of Patent: Feb. 28, 2012

(54) METHOD AND APPARATUS AS PERTAINS TO A BIOMETRIC TEMPLATE AND A CORRESPONDING PRIVACY POLICY

(75) Inventors: Steven Gillig, Roselle, IL (US); Jeffrey D. Bonta, Arlington Heights, IL (US); Ezzat A. Dabbish, Cary, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 928 days.

(21) Appl. No.: 12/043,535

(22) Filed: Mar. 6, 2008

(65) Prior Publication Data

US 2009/0228952 A1 Sep. 10, 2009

(51) Int. Cl.
G06F 17/00 (2006.01)

(52) U.S. Cl. ......................................................... 726/1

(58) Field of Classification Search .................. 713/186, 713/185, 168, 176; 726/1, 26; 455/41.1, 455/41.2
See application file for complete search history.

(56) References Cited

U.S. PATENT DOCUMENTS

| | | | |
|---|---|---|---|
| 6,836,554 B1 * | 12/2004 | Bolle et al. ..................... | 382/116 |
| 6,957,337 B1 * | 10/2005 | Chainer et al. ................. | 713/186 |
| 7,138,902 B2 * | 11/2006 | Menard ......................... | 340/5.53 |
| 7,177,426 B1 | 2/2007 | Dube | |
| 7,275,102 B2 | 9/2007 | Yeager et al. | |
| 7,689,167 B2 * | 3/2010 | Sengupta et al. ............. | 455/41.2 |
| 7,813,727 B2 * | 10/2010 | Ritter .............................. | 455/419 |
| 7,886,156 B2 * | 2/2011 | Franchi ......................... | 713/186 |
| 7,925,022 B2 * | 4/2011 | Jung et al. ..................... | 380/270 |
| 8,014,722 B2 * | 9/2011 | Abel et al. .................... | 455/41.1 |
| 2006/0050931 A1 | 3/2006 | Oka | |
| 2007/0011464 A1 * | 1/2007 | Gorelik et al. ................. | 713/186 |
| 2007/0177771 A1 * | 8/2007 | Tanaka et al. ................. | 382/115 |
| 2007/0233615 A1 | 10/2007 | Tumminaro | |
| 2007/0244811 A1 | 10/2007 | Tumminaro | |
| 2007/0283165 A1 * | 12/2007 | Milgramm et al. ........... | 713/186 |

FOREIGN PATENT DOCUMENTS

| | | |
|---|---|---|
| KR | 1020020078327 A1 | 10/2002 |
| KR | 1020070011685 A1 | 1/2007 |
| KR | 10-0682057 B1 | 2/2007 |

OTHER PUBLICATIONS

Patent Cooperation Treaty; "Notification of Transmittal of the International Search Report and the Written Opinion of the International Searching Authority", for International Application No. PCT/US2009/035791; Oct. 20, 2009; 10 Pages.

* cited by examiner

Primary Examiner — Beemnet Dada

(57) ABSTRACT

At a two-way communications apparatus (200) of choice, one can detect (101) a two-way communications apparatus user instruction and then, in response to detecting that instruction, provide (102) certain information to a nearby two-way communications apparatus (208) via a near field communications link (206). This information can comprise, at least in part, a biometric template as pertains to a user of the two-way communications apparatus and a privacy policy as pertains to further dissemination of the biometric template.

21 Claims, 2 Drawing Sheets

METHOD AND APPARATUS AS PERTAINS TO A BIOMETRIC TEMPLATE AND A CORRESPONDING PRIVACY POLICY

TECHNICAL FIELD

This invention relates generally to two-way communications and more particularly to the dissemination and/or use of user information.

BACKGROUND

So-called social networks are known in the art. As used herein, this expression refers to a group of users who share content with one another as members in a structured sharing context via an intervening data communications network (such as, but not limited to, an Internet Protocol-based communications network). In particular, these users are able to employ the network to share their information with one another notwithstanding a lack of being face-to-face with one another. To a growing extent, mobile communications platforms (such as, but not limited to, cellular telephones) are able to support varying kinds of social networking capabilities. This, in turn, permits the users of such platforms to remain in touch with their respective social network members.

Though popular and growing with respect to usage and applications, present social networking methodologies do not necessarily meet all potential user needs and requirements. As one pertinent example in this regard, many such social networking techniques presume and rely upon some level of trust that may, or may not, in fact be a valid presumption. Part of the problem is that there are at least two primary areas where trust can be breached; with respect to the security of the data communications network itself and with respect to the recipients and their treatment and use of a given user's disseminated content. Many prior art solutions are directed primarily at the former but give scant attention to the latter.

As a result, in all too many application settings, a given social networking approach will provide adequate security for information while conveying that information between members of the social network (using, for example, encryption or the like) but will provide inadequate assurances regarding who actually legitimately receives that information and what they do next. Lack of trust in this regard can hamper and discourage certain users from making use of social networking technologies with respect to at least some of their interests.

BRIEF DESCRIPTION OF THE DRAWINGS

The above needs are at least partially met through provision of the method and apparatus as pertains to a biometric template and a corresponding privacy policy described in the following detailed description, particularly when studied in conjunction with the drawings, wherein.

Figure 1:
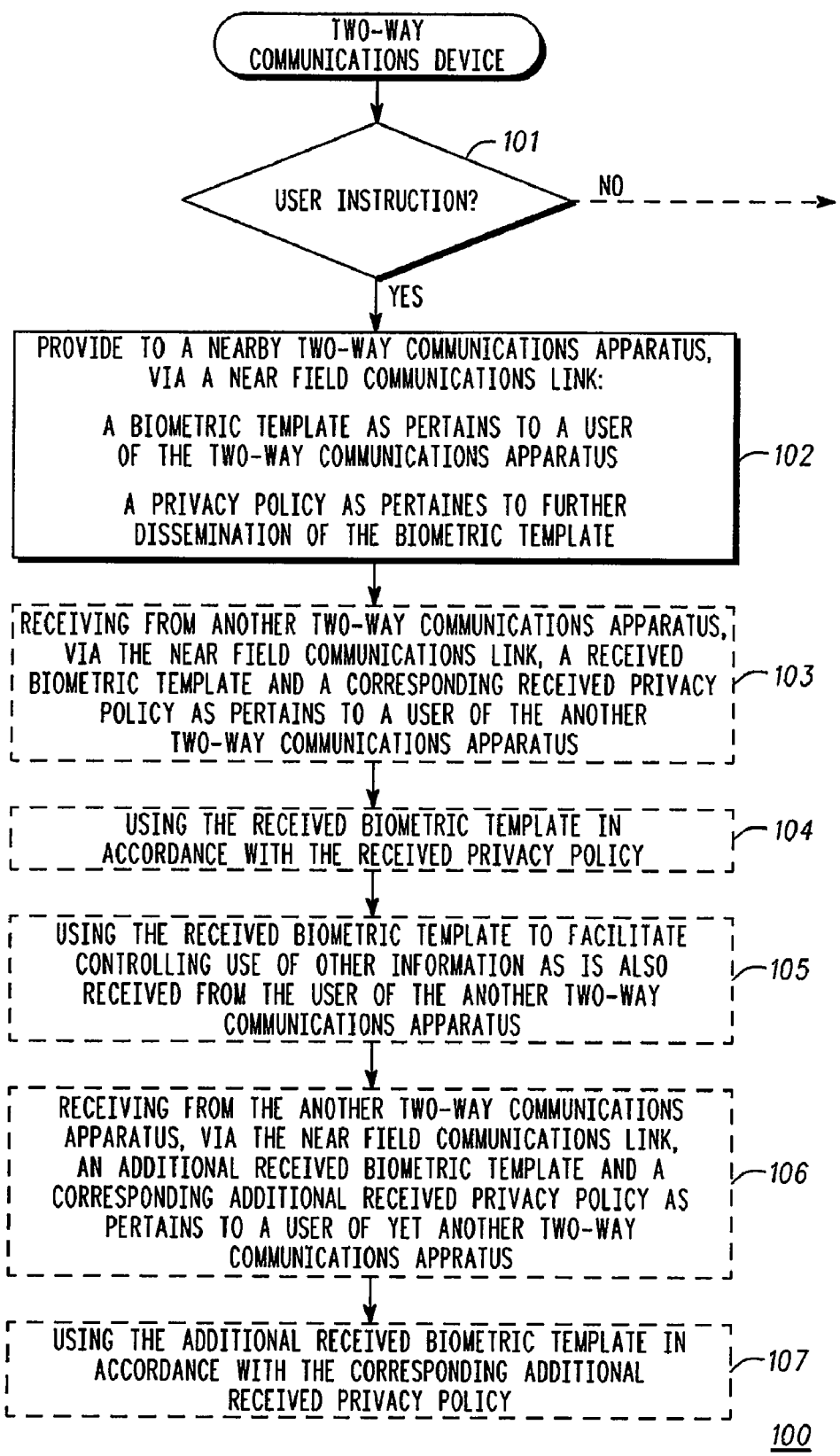
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, these various embodiments can be carried out, in whole or in part, at a two-way communications apparatus of choice. This can comprise detecting a two-way communications apparatus user instruction and then, in response to detecting that instruction, providing certain information to a nearby two-way communications apparatus via a near field communications link. This information can comprise, at least in part, a biometric template as pertains to a user of the two-way communications apparatus and a privacy policy as pertains to further dissemination of the biometric template.

The near field communications link can comprise any of a variety of suitable carriers including, but not limited to, a radio frequency-based carrier, a light-based carrier, and a sound-based carrier. The biometric template can be based, for example, upon a biological physical pattern as pertains to the user, a behavioral pattern as pertains to the user, and so forth.

The privacy policy can comprise, if desired, a policy which has been selected from amongst a plurality of available candidate privacy policies. By this approach a given user can select a particular policy having conditions and stipulations that best serve the needs of a given instance and application setting. This privacy policy can control, for example, further dissemination of the biometric template by the immediate recipient of the biometric template and/or subsequent recipients (that is, other parties and/or platforms who receive the biometric template other than from the original source of the biometric template). In addition, if desired, this privacy policy can contain terms and the like to control usage of other information as may be provided by the user of the two-way communications apparatus (either via the near field communications link or via some other communications link such as a wireless telephony link).

So configured and arranged, these teachings permit a given user to establish a high level of trust with respect to the individual recipients of their information. In particular, if desired, a given user can limit their social network to only those persons whom the given user has met in a face-to-face encounter (and hence providing the required proximity to support the aforementioned near field communications opportunity). As a further example of the flexibility offered via these teachings, such a user could also elect to permit the sharing of their information with other persons who have not met face-to-face with the user but who have met face-to-face with another user in whom the given user has trust.

The aforementioned biometric template can be employed in various ways to control the dissemination and/or use of a given corresponding user's information as will be well understood by those skilled in the art. It will be further appreciated that these teachings are highly leverageable and can be employed in conjunction with a wide variety of social networking and other networking methodologies. This includes both presently existing approaches as well as approaches that are developed going forward. It will also be appreciated that these teachings are highly scalable and will readily accommodate a relatively smaller or larger number of participants and application settings. It will also be noted that these teachings can be implemented in a relatively cost effective manner.

These and other benefits may become clearer upon making a thorough review and study of the following detailed description. Referring now to the drawings, and in particular to FIG. 1, an illustrative process that is compatible with many of these teachings will now be presented. As noted above, these teachings are applicable for use with a two-way communications apparatus (including, for example, both short range and long range mobile and stationary wireless platforms such as, but not limited to, cellular telephones, server platforms, or the like).

Pursuant to the illustrated process 100, the two-way communications apparatus detects 101 the occurrence of a two-way communications apparatus user instruction. This can be facilitated in any of a variety of ways. By one approach, for example, the two-way communications apparatus can receive such a user instruction via a push button, a key pad, a touch screen, a voice command, and so forth. The particular interface element employed can be dedicated to this purpose or can comprise a dynamically assignable interface element as desired. Those skilled in the art will recognize and understand that these examples are intended to serve only in an illustrative capacity and are not intended to comprise an exhaustive listing of all possibilities in this regard. The user instruction itself can comprise a instruction that is configured and arranged to specifically cause the following actions to be taken or can comprise an instruction that causes the following actions to be taken as incidental to, or supportive of, some other directly specified functionality or activity.

In the absence of detecting 101 this user instruction, this process 100 can proceed as may otherwise be desired by the programmer or designer. Upon detecting such a user instruction, however, this process 100 then provides 102, to a nearby two-way communications apparatus and via a near field communications link, certain information.

As used herein, this reference to "near by" will be understood to refer to a distance that is commensurate with an ordinary face-to-face human verbal exchange and can range from a few inches to perhaps 2 or three meters. Accordingly, it will be understood and appreciated that these particular steps are typically carried out when the user of the two-way communications apparatus and the user of the nearby two-way communications apparatus are engaged in a face-to-face encounter (though other circumstances which will yield the desired personal association may be encompassed as well).

Also as used herein, this reference to "near field" will be understood to refer to a form of wireless communications that is, by design and/or operation, a very short range approach to communications. Such an operational limitation will then assist with tending to ensure that these particular actions are only successfully undertaken with respect to a nearby two-way communications apparatus having a corresponding user who is also nearby to the user of the two-way communications apparatus. Bluetooth-based communications, for example, might comprise one example in this regard though standard Bluetooth has a range of about ten meters which will typically exceed requirements in this regard. Light-based free space methodologies (employing, for example, modulated infrared light pulses) may also apply in this regard. Generally speaking, the near field communications link can comprise any carrier mechanism of choice including but not limited to a radio frequency-based carrier, a light-based carrier, or a sound-based carrier.

The aforementioned information as is provided to the nearby two-way communications apparatus via the near field communications link can comprise, for example, a biometric template as pertains to a user of the two-way communications apparatus and a privacy policy as pertains, at least in part, to further dissemination of the biometric template. This biometric template can vary with the needs and/or opportunities as tend to characterize a given application setting. Examples include, but are not limited to, a biological physical pattern as pertains to the user (such as, but not limited to, asperity patterns (such as fingerprints, toeprints, palm prints, and so forth), retinal patterns, vocal patterns, DNA-based markers, handwriting patterns, and so forth) and/or behavioral patterns as pertain to the user (such as, but not limited to, keypad typing patterns or the like). This biometric template can be encrypted using any encryption methodology of choice, if desired.

Various means and ways of capturing and characterizing such biometrics are known in the art and others are likely to be developed going forward. Various approaches are known in the art in this regard. As these teachings are not overly sensitive to any particular selection in this regard, for the sake of brevity and the preservation of clarity, further elaboration in this regard will not be presented here aside from noting that the amount of resolution and/or specificity as is utilized to capture and characterize the biometric of choice can vary with the needs and/or opportunities as tend to characterize a given application setting. Those skilled in the art will recognize that such biometric information may be captured in the first instance by the two-way communications apparatus itself (presuming the onboard availability of appropriate corresponding biometric detectors) and/or can be received by the two-way communications apparatus from another (likely trusted) source (for example, as contained within a small memory card as may be inserted into the two-way communications apparatus by the user, as may be received via a corresponding website or other online source, and so forth).

As noted, the privacy policy can pertain, at least in part, to further dissemination of the biometric template itself. This privacy policy can comprise, by one approach, a particular user-selected policy as was selected by the user from amongst a plurality of available candidate privacy policies. (As used herein, the expression "available candidate privacy policies" will be understood to refer to policies that are at least substantially complete with respect to their relevant terms and conditions such that the user is able to select from amongst a variety of already-specified policies. These candidate policies may all be already resident and available at the two-way communications apparatus or may be, for example, downloadable or otherwise accessible to the user via the two-way communications apparatus. It will be further understood that the expression "available candidate privacy policies" does not preclude policies that are partially incomplete and which may be (or must be) completed in certain details by the user.)

As another example, this privacy policy can pertain to further dissemination of the biometric template by another user who receives the biometric template from this initial nearby user. To illustrate, such further dissemination may be prohibited. As another illustrative example, such further dissemination may be permitted provided certain conditions are met as may be identified by the privacy policy.

Such a policy can stipulate, for example, certain rules, requirements, and/or preferences with respect to further dissemination of the biometric template by a user of the nearby two-way communications apparatus. To illustrate, one such policy might prohibit any further dissemination of the biometric template by this particular recipient. As another illustrative example, one such policy might permit this nearby recipient to further disseminate the biometric template to only certain particularly identified parties. The identifying information for such parties might be specifically contained in the privacy policy (and may even include, for example, the corresponding biometric templates for such persons). By another approach, the privacy policy may contain information (such as a network address) that can be used by the recipient to acquire the identifying information (as when, for example, the recipient is to access a remote server in order to obtain the described information).

By one approach, this policy can be complete in and of itself In such a case, for example, the policy contains terms and conditions with sufficient specificity so as to be fully or largely self-implementable without requiring the recipient to access other resources for enabling content or interpretation. By another approach, this policy may be represented by an abbreviated identifier. In such a case the identifier may comprise, for example, an alphanumeric code, marker, pointer, or link that the recipient uses in conjunction with other information (such as, in one simple example, a look-up table) in order to determine the stipulations of the privacy policy. Those skilled in the art will recognize that the privacy policy may also comprise a combination of both of these approaches.

The particular requirements or preferences as may apply to dissemination of the biometric template can be as many and/or as varied as may suit the needs of a given application setting. Some possibilities in this regard include, but are not limited to, limitations regarding to whom the biometric template can be disseminated, limitations regarding how the biometric template can be disseminated, limitations regarding when the biometric template can be disseminated, and so forth.

In addition to containing requirements or preferences regarding further dissemination of the biometric template, the privacy policy can also contain requirements or preferences regarding the further dissemination and/or use of other information as may also be provided by user of the two-way communications apparatus. This can refer both to information as may be provided via the aforementioned near field communications link as well as information as may be provided via another communications link. Examples as to the latter might include, but are not limited to, a cellular telephone-based communications link.

As with dissemination of the biometric template itself, the privacy policy can set requirements or preferences regarding who can receive or use content such as other information, how such other information is conveyed, stored, and/or used, and/or when such other information is conveyed, stored, and/or used. Other possibilities exist in this regard as well and will vary from one application setting to another.

There are various ways in which this biometric template and its corresponding privacy policy can be employed and leveraged. For the sake of illustration, numerous examples in this regard will now be provided. Those skilled in the art will recognize and understand that these examples are intended to serve only in an illustrative capacity and are not intended to comprise an exhaustive listing of all possibilities in this regard.

With continued reference to FIG. 1, this process 100 can optionally provide for receiving 103, from another two-way communications apparatus and again via the aforementioned near field communications link, a biometric template (referred to hereafter as a received biometric template) along with a corresponding privacy policy which both pertain to the user of this another two-way communications apparatus. In such a case, the receiving two-way communications apparatus can then use 104 this received biometric template in accordance with its corresponding privacy policy.

This can comprise, as one example, controlling further dissemination of the received biometric template to others. By one approach, as noted above, the corresponding privacy policy may prohibit such dissemination under any circumstances. By another approach, the corresponding privacy policy may permit further dissemination of the received biometric template to other recipients who meet some predefined criteria (such as having a particular user identifier, belonging to a specific trusted affinity group, and so forth).

With continued reference to FIG. 1, this process 100 will also accommodate using 105 the received biometric template to facilitate, for example, controlling use of other information as is also received from the user of the another two-way communications apparatus. This can specifically include, for example, information that is received other than via the aforementioned near field communications link (and hence can include, for example, information received via a longer range communications link such as a cellular telephony link, a so-called WiMAX link, and so forth). This can also apply both to such other information as is received directly from the user of the another two-way communications apparatus as well information that is received indirectly (via, for example, one or more intervening other users).

To provide further illustrative examples in this regard, but again without intending any corresponding limitations as to the scope of these teachings, this can comprise later receiving a biometric sample from the user of the another two-way communications apparatus and comparing that biometric sample with the aforementioned received biometric template to thereby yield and provide a comparison result. Use of the aforementioned other information can then be controlled as a function, at least in part, of this comparison result. As one simple example in this regard, further use of the information may be prohibited when this comparison result is negative (which would of course suggest that the user providing the biometric sample is not, in fact, the user they purport to be). This can also include, if desired, prohibiting changes to the biometric template and/or the corresponding privacy policy in such a case.

As alluded to earlier, these teachings will also accommodate receiving biometric templates and corresponding privacy policies for users with whom the present user is not engaged in a face-to-face encounter (presuming, of course, that the applicable privacy policy permits such a transaction to occur). In such a case, and referring still to FIG. 1, this process 100 will optionally accommodate receiving 106 (via the near field communications link) additional received biometric templates and corresponding additional privacy policies as pertain to these other users of other two-way communications apparatuses. Upon their receipt, the receiving platform can then use 107 these additional received biometric templates in accordance with their corresponding additional received privacy policy (essentially, in this example, as if such information had been obtained directly from the original sourcing user).

So configured and arranged, those skilled in the art will recognize and understand that these teachings are highly leverageable and can be usefully applied in a wide variety of application settings. The privacy policies can be used to control, for example, further dissemination of corresponding biometric templates and can also be used to control the further dissemination and/or use of other information as may pertain to the corresponding user.

In many of the illustrative examples provided above, the actions taken tend to occur with the receiving platform following the initial provision of the biometric template. It will be well understood, however, that these teachings are also highly applicable in conjunction with the operations and functionality of the transmitting platform. As but one example in this regard, and again without intending any limitations by way of this example, these teachings will readily accommodate facilitating a comparison of a biometric sample from the user of a given two-way communications apparatus with the initially mentioned biometric template to provide a corresponding comparison result. The use of information of persons other than this user can then be controlled as a function, at least in part, of these comparison results. This approach can tend to ensure, for example, that the person attempting to access or otherwise use or manipulate a given party's information must first essentially prove and confirm their identity before such access will be enabled.

These biometric templates and their privacy policies can be employed in other ways as well. By one approach, for example, a given biometric template at a given apparatus (whether created in the first instance by that apparatus or received directly or indirectly as described above) can be used to authenticate the identity of a given person who is using that apparatus to attempt to access some information that is stored at or that is otherwise available via that apparatus. This will permit, for example, members of a common social network to have controlled access to content on one another's devices if desired. By way of illustration, a first person could gain access to their own information is as stored on another person's cellular telephone upon verifying their identity through presentation of the corresponding biometrics (presuming that their biometric template is available at that cellular telephone and presuming further that the corresponding privacy policy provides for such access).

By one approach, this identification functionality can be fully locally supported. In this case, the two-way communications apparatus itself receives the biometric sample and makes the corresponding comparison with a locally stored biometric template. By another approach, at least part of this functionality can be supported via a remote resource such as a corresponding identification confirmation server. By this approach, for example, the two-way communications apparatus can forward the biometric sample to the server which then makes the desired comparison and provides the corresponding comparison result back to the two-way communications apparatus.

Figure 2:
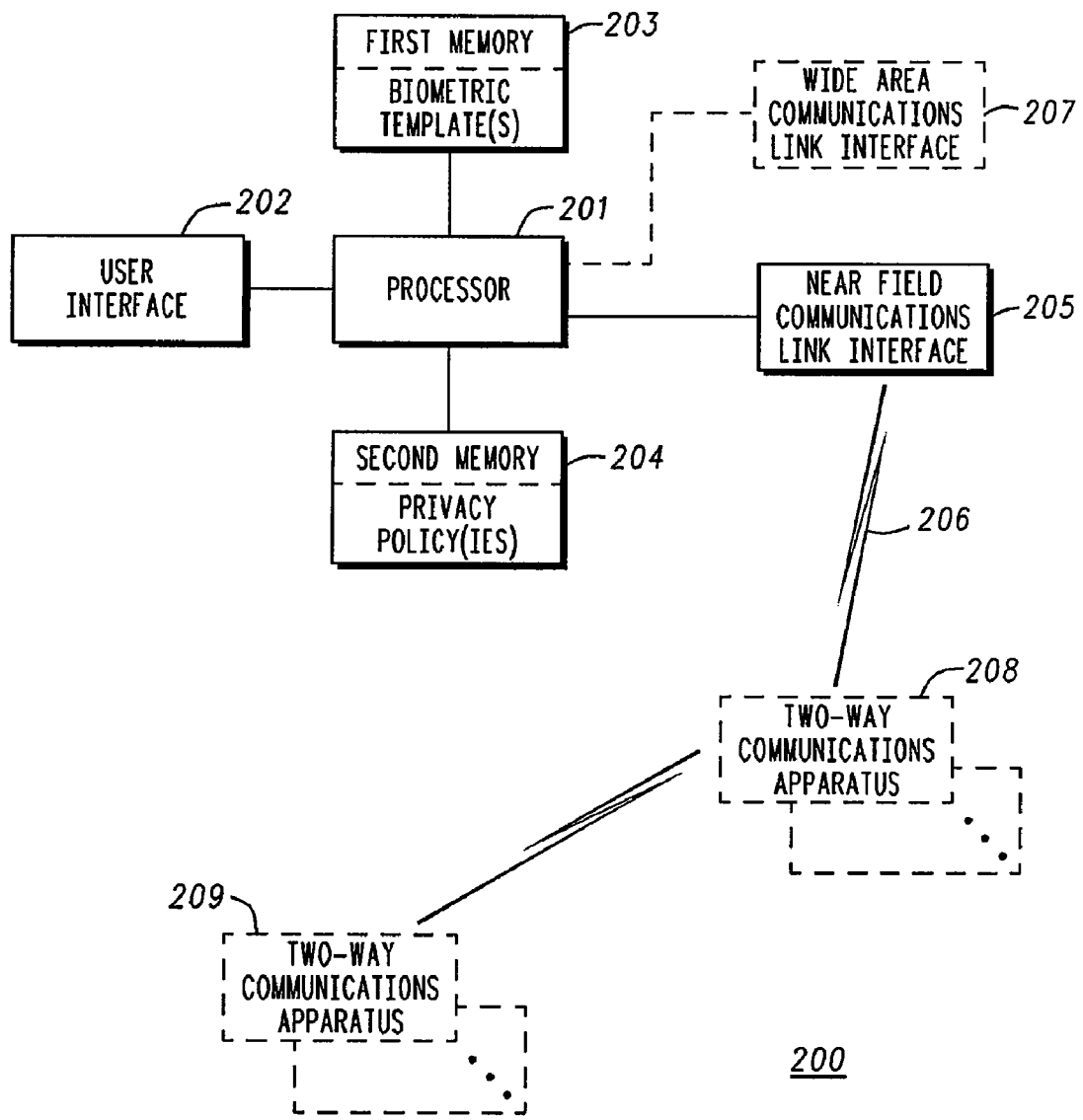
FIG. 2 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 2, an illustrative approach to such a platform will now be provided.

In this illustrative example, a two-way communications apparatus 200 can be comprised of a processor 201 that operably couples to a user interface 202, a first memory 203 (which serves, at least in part, to store one or more of the aforementioned biometric templates), a second memory 204 (which serves, at least in part, to store one or more of the aforementioned corresponding privacy policies), and a near field communications link interface 205. Those skilled in the art will recognize and appreciate that such a processor 201 can comprise a fixed-purpose hard-wired platform or can comprise a partially or wholly programmable platform. All of these architectural options are well known and understood in the art and require no further description here. It will also be understood that the memory components shown can com-
prise a plurality of memory elements (as is suggested by the illustration) or can be comprised of a single memory element.

The user interface 202 can comprise any interface modality of choice including but not limited to a wide variety of buttons, potentiometers, sliders, switches, touch screens, and/or cursor control and selection tools as are known in the art. Similarly, the near field communication link interface 205 can be selected to compatibly accommodate any of a wide variety of near field communication links 206 including, but not limited to, radio frequency-based carriers, light-based carriers, and sound-based carriers.

The processor 201 can then be configured and arranged (via, for example, corresponding programming as will be well understood by those skilled in the art) to carry out one or more of the steps, actions, and functionality described herein. This can comprise, for example, detecting the assertion of a user instruction via the user interface 202 and responsively providing to a nearby two-way communications apparatus 208, via the near field communications link interface 205, a biometric template and privacy policy as recovered from the corresponding memories 203 and 204. This can also include any of the other steps and actions described herein including, for example, receiving biometric templates/privacy policies from the aforementioned nearby two-way communications apparatus 208 as pertain to a user of that nearby two-way communications apparatus 208 and/or as pertain to the users of more distant two-way communications apparatuses 209.

As noted above, these biometric templates and privacy policies can be used to also control the dissemination and/or usage of other information as may be received or transmitted by the two-way communications apparatus 200. Towards this end, if desired, the two-way communications apparatus 200 can also have a wide area communications link interface 207 that operably couples to the processor 201 to facilitate sending and/or receiving such other information. This wide area communications link interface 207 can comprise, for example, a cellular telephone link, a push-to-talk long range radio network link (such as a public safety radio network link), or a WiMAX link, to note but a few examples in this regard.

Those skilled in the art will recognize and understand that such an apparatus 200 may be comprised of a plurality of physically distinct elements as is suggested by the illustration shown in FIG. 2. It is also possible, however, to view this illustration as comprising a logical view, in which case one or more of these elements can be enabled and realized via a shared platform. It will also be understood that such a shared platform may comprise a wholly or at least partially programmable platform as are known in the art.

So configured and arranged, these teachings are well suited to support the controlled sharing of sensitive information within a social network of choice. The user who sources such information can be provided with a considerable degree of flexibility and control regarding how far such information can be dispersed and how the usage of such information can be controlled when dispersed. Considerable faith and trust in the sanctity of the care of their information is suitably based upon a fundamental tenant of interpersonal relations (in particular, the face-to-face encounter) and the follow-on use of biometrics that can reliably ensure the veracity of a given user's identification and credentials.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As one example in this regard, these teachings will readily accommodate using more than one biometric template for a given user. This might include, for example, providing a plurality of fingerprint biometrics to accommodate more than one finger of the user. As another example, this might include providing both a fingerprint biometric template and a retinal pattern biometric template. As another example in these regards, in lieu of the aforementioned biometric template or in conjunction therewith, one may also employ a similar mechanism to accommodate using environmental and/or contextual patterns or conditions information as a vetting mechanism. These teachings could also be further extended to include such other information as information regarding the individual's hobbies, favorite movies, foods, restaurants, drinks, songs, or the like, their friends and family, particular photographs or videos, and so forth.

We claim:

1. A method comprising:
at a two-way communications apparatus:
  detecting a two-way communications apparatus user instruction;
  in response to detecting the two-way communications apparatus user instruction, providing to a nearby two-way communications apparatus, via a near field communications link, the near field communications link operating within a range of about ten meters or less:
    a biometric template as pertains to a user of the two-way communications apparatus;
    a privacy policy as pertains to further dissemination of the biometric template; and
    the biometric template and the dissemination of the biometric template being controlled by the user instruction.

2. The method of claim 1 wherein the near field communications link comprises at least one of:
  a radio frequency-based carrier;
  a light-based carrier;
  a sound-based carrier.

3. The method of claim 1 wherein the biometric template comprises a template as pertains to at least one of:
  a biological physical pattern as pertains to the user;
  a behavioral pattern as pertains to the user.

4. The method of claim 1 wherein the privacy policy comprises a user-selected policy as was selected from amongst a plurality of available candidate privacy policies.

5. The method of claim 1 wherein the privacy policy pertains to further dissemination of the biometric template by a user of the nearby two-way communications apparatus.

6. The method of claim 5 wherein the privacy policy further pertains to further dissemination of the biometric template by another user who received the biometric template from the user of the nearby two-way communications apparatus.

7. The method of claim 1 further comprising:
  receiving from the another two-way communications apparatus, via the near field communications link, a received biometric template and a corresponding received privacy policy as pertains to a user of the another two-way communications apparatus;
  using the received biometric template in accordance with the received privacy policy.

8. The method of claim 7 wherein using the received biometric template in accordance with the received privacy policy comprises controlling further dissemination of the received biometric template to third parties as a function, at least in part, of the received privacy policy.

9. The method of claim 7 further comprising:
  also receiving from the another two-way communications apparatus, via the near field communications link, an additional received biometric template and a corresponding additional received privacy policy as pertains to a user of yet another two-way communications apparatus;
  using the additional received biometric template in accordance with the corresponding additional received privacy policy.

10. The method of claim 7 further comprising:
  using the received biometric template to facilitate controlling use of other information of the user of the another two-way communications apparatus as is also received.

11. The method of claim 10 wherein using the received biometric template to facilitate controlling use of other information as is also received from the user of the another two-way communications apparatus comprises, at least in part:
  receiving a biometric sample from the user of the another two-way communications apparatus;
  comparing the biometric sample with the received biometric template to provide a comparison result;
  controlling the use of the other information as a function, at least in part, of the comparison result.

12. The method of claim 1 further comprising:
  using the biometric template to facilitate controlling an ability of a user of the two-way communications apparatus to access received information.

13. The method of claim 1 further comprising:
  facilitating comparison of a biometric sample from the user of the two-way communications apparatus with the biometric template to provide a comparison result;
  controlling use of information of persons other than the user of the two-way communications apparatus as a function, at least in part, of the comparison result.

14. An apparatus comprising:
  a user interface;
  a near field communications link interface for accommodating a near field communications link which operates within a range of about ten meters or less;
  a first memory having at least a biometric template stored therein as pertains to a user of the apparatus;
  a second memory having a privacy policy as pertains to further dissemination of the biometric template stored therein; and
  a processor operably coupled to the user interface, the near field communications link interface, the first memory, and the second memory and being configured and arranged to:
    detect a user instruction as input via the user interface, the user instruction controlling the biometric template and the dissemination of the biometric template;
    in response to detecting the user instruction, providing to a nearby apparatus being used by another user, via the near field communications link interface:
      the biometric template;
      the privacy policy.

15. The apparatus of claim 14 wherein the near field communications link interface comprises at least one of:
  a radio frequency-based carrier interface;
  a light-based carrier interface;
  a sound-based carrier interface.

16. The apparatus of claim 14 wherein the biometric template comprises a template as pertains to at least one of:
  a biological physical pattern as pertains to the user;
  a behavioral pattern as pertains to the user.

17. The apparatus of claim 14 wherein the second memory has stored therein a plurality of available candidate privacy policies.

18. The apparatus of claim 14 wherein the privacy policy pertains to further dissemination of the biometric template by the another user of the nearby apparatus.

19. The apparatus of claim 14 wherein the processor is further configured and arranged to:

receive from the nearby apparatus, via the near field communications link interface, a received biometric template and a corresponding received privacy policy as pertains to the another user of the nearby apparatus;

using the received biometric template in accordance with the received privacy policy.

20. The apparatus of claim 19 wherein the processor is further configured and arranged to use the received biometric template in accordance with the received privacy policy by controlling further dissemination of the received biometric template to third parties as a function, at least in part, of the received privacy policy.

21. The method of claim 2, wherein the radio frequency-based carrier comprises a Bluetooth-based link and the light-based carrier comprises modulated infrared light.

* * * * *